(12) United States Patent
Angell et al.

(10) Patent No.: US 9,734,464 B2
(45) Date of Patent: Aug. 15, 2017

(54) AUTOMATICALLY GENERATING LABOR STANDARDS FROM VIDEO DATA

(75) Inventors: Robert Lee Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 2959 days.

(21) Appl. No.: 11/853,491

(22) Filed: Sep. 11, 2007

(65) Prior Publication Data

US 2009/0070163 A1    Mar. 12, 2009

(51) Int. Cl.
*G06Q 10/00* (2012.01)
*G06Q 10/06* (2012.01)
*G06Q 10/04* (2012.01)

(52) U.S. Cl.
CPC ............ *G06Q 10/06* (2013.01); *G06Q 10/04* (2013.01); *G06Q 10/06316* (2013.01)

(58) Field of Classification Search
CPC .............................. G06Q 10/00; G06Q 30/00
USPC ......................................................... 705/7.11
See application file for complete search history.

(56) References Cited

U.S. PATENT DOCUMENTS

| | | | |
|---|---|---|---|
| 4,535,466 A * | 8/1985 | Palvolgyi | ......................... 377/54 |
| 5,956,081 A | 9/1999 | Katz et al. | |
| 6,118,887 A | 9/2000 | Cosatto et al. | |
| 6,393,163 B1 | 5/2002 | Burt et al. | |
| 6,738,532 B1 | 5/2004 | Oldroyd | |
| 6,754,389 B1 | 6/2004 | Dimitrova et al. | |
| 6,856,249 B2 | 2/2005 | Strubbe et al. | |
| 7,103,437 B2 * | 9/2006 | Yoshikawa | .............. G07C 1/10 700/108 |
| 7,200,266 B2 | 4/2007 | Ozer et al. | |
| 7,224,852 B2 | 5/2007 | Lipton et al. | |
| 7,365,746 B1 * | 4/2008 | Train | ...................... G09F 19/22 345/427 |
| 7,394,916 B2 | 7/2008 | Brodsky et al. | |
| 7,480,395 B2 | 1/2009 | Parunak et al. | |
| 2002/0114493 A1 * | 8/2002 | McNitt et al. | ................ 382/107 |
| 2003/0088534 A1 * | 5/2003 | Kalantar et al. | ................ 706/50 |

(Continued)

OTHER PUBLICATIONS

Collins et al., "A System for Video Surveillance and Monitoring", VSAM Final Report, Technical Report, CMU-RI-TR-00-12, pp. 1-69, May 2000.

(Continued)

*Primary Examiner* — Kira Nguyen
(74) *Attorney, Agent, or Firm* — Yee & Associates, P.C.; Maeve M. Carpenter

(57) ABSTRACT

A computer implemented method, apparatus, and computer usable program product for creating a labor standard for a task. The process automatically detects event data derived from a continuous video stream, wherein the event data comprises metadata describing a sequence of motions for performing the task, and parses the event data to identify appropriate event data describing a discrete set of motions from the sequence of motions. The process then analyzes, using an analysis server, the discrete set of motions to form a labor standard, wherein the labor standard specifies an optimal manner of performing the discrete set of motions. Thereafter, the process generates a set of recommendations for performing the task efficiently according to the labor standard.

20 Claims, 5 Drawing Sheets

(56) References Cited

U.S. PATENT DOCUMENTS

| | | |
|---|---|---|
| 2003/0228035 A1 | 12/2003 | Parunak et al. |
| 2003/0231769 A1 | 12/2003 | Bolle et al. |
| 2004/0113933 A1 | 6/2004 | Guler |
| 2004/0120581 A1 | 6/2004 | Ozer et al. |
| 2004/0136276 A1* | 7/2004 | Lander .................. 368/239 |
| 2004/0151374 A1 | 8/2004 | Lipton et al. |
| 2004/0156530 A1 | 8/2004 | Brodsky et al. |
| 2005/0012817 A1 | 1/2005 | Hampapur et al. |
| 2005/0278062 A1* | 12/2005 | Janert et al. ........... 700/214 |
| 2006/0007308 A1 | 1/2006 | Ide et al. |
| 2007/0250286 A1* | 10/2007 | Duncan et al. ......... 702/139 |
| 2007/0282479 A1* | 12/2007 | Shibuya et al. ........ 700/111 |
| 2007/0291118 A1 | 12/2007 | Shu |
| 2008/0273088 A1 | 11/2008 | Shu |

OTHER PUBLICATIONS

Greiffenhagen et al., "Design, analysis and engineering of video monitoring systems: an approach and case study", The Proceedings of the IEEE, vol. 89, No. 10, 1 page, Oct. 2001.

Hampapur et al., SMART Video Surviellance, Exploring the concept of multiscale spatiotemporal tracking, IEEE Signal Processing Magazine, 16 pages, Mar. 2005.

Lipton et al., Critical Asset Protection, Perimeter Monitoring, and Threat Detection Using Automated Video Surveillance, Object Video 11600 Sunrise Valley Dr, Suite 290 Reston, VA 20191, pp. 1-11, Mar. 2004.

Mitchel, "Computerizing Video Surveillance Techniques", IBM Technical Disclosure Bulletin, n5, 10-92, pp. 403-404.

Office Action, dated Dec. 10, 2010, regarding U.S. Appl. No. 11/455,251, 5 pages.

Final Office Action, dated Apr. 27, 2011, regarding U.S. Appl. No. 11/455,251, 5 pages.

Office Action, dated Jun. 12, 2014, regarding U.S. Appl. No. 11/455,251, 7 pages.

Office Action, dated Oct. 23, 2014, regarding U.S. Appl. No. 11/455,251, 7 pages.

Final Office Action, dated Feb. 24, 2015, regarding U.S. Appl. No. 11/455,251, 6 pages.

Final Office Action, dated May 9, 2012, regarding U.S. Appl. No. 12/132,872, 6 pages.

Final Office Action, dated Aug. 5, 2014, regarding U.S. Appl. No. 12/132,872, 6 pages.

Hampapur et al., "The IBM Smart Surveillance System," Proceedings of IEEE Conference on Computer Vision and Pattern Recognition, Jun. 2004, 2 pages.

* cited by examiner

AUTOMATICALLY GENERATING LABOR STANDARDS FROM VIDEO DATA

CROSS-REFERENCE TO RELATED APPLICATIONS

The present invention is related to the application entitled Intelligent Surveillance System and Method for Integrated Event Based Surveillance, application Ser. No. 11/455,251 (filed Jun. 16, 2006), assigned to a common assignee, and which is incorporated herein by reference.

BACKGROUND OF THE INVENTION

1. Field of the Invention

The present invention relates generally to an improved data processing system, and in particular, to a computer implemented method and apparatus for generating labor standards. Still more particularly, the present invention relates to a computer implemented method, apparatus, and computer usable program product for utilizing digital video modeling to generate labor standards from video data.

2. Description of the Related Art

Labor standards are guidelines implemented by organizations to standardize and streamline the performance of repetitive tasks. Labor standards describe in detail how one or more tasks of a process should be performed. For example, labor standards may describe the performance of a discrete set of motions to complete a particular task, the type of tools necessary to perform the discrete set of motions, and an amount of time allocated to complete the discrete set of motions in a safe and repeatable way. A discrete set of motions is one or more motions that must be performed to complete a task. The completion of a task requires the performance of a sequence of motions. The sequence of motions is a series of one or more discrete sets of motions. By implementing labor standards, tasks are performed with greater efficiency.

For example, a labor standard relating to bricklaying may include a description for the placement of a bricklayer's feet in relation to a wall, a mortar box, and a pile of bricks; a description of an optimum height for the mortar box and bricks in relation to the bricklayer; and the discrete set of motions necessary for selecting a brick, applying mortar, and placing the brick into the wall. The sequence of motions includes the discrete set of motions relating to the selection of a brick, applying mortar, and placing the brick into the wall. In addition, this labor standard may specify a specific orientation of each brick in the pile of bricks, a preferred depth of the mortar box, and a time for completing each motion in the discrete set of motions.

One currently used method for developing labor standards requires an industrial engineer to break the selected task down into component parts. Each component part is analyzed using time studies, motion studies, and work sampling. After sufficient data has been gathered, the industrial engineer can eliminate unnecessary motions and allocate an amount of time to perform the remaining motions to complete the task in an efficient manner. However, this method of generating labor standards is time and labor intensive because it may require a team of industrial engineers to closely monitor numerous workers performing the task over an extended period of time to collect enough data to create an optimum labor standard.

Another currently used method for generating a labor standard involves the use of industry-specific standards to form a generic labor standard. Because every task is comprised of a discrete set of motions, such as picking up a product and putting it on a pallet, moving a pallet to a particular location, and unloading the pallet, various industries have compiled accepted standards describing how long each particular motion from the set of motions should take. The sum of the motions necessary for completing a task forms the generic labor standard. However, this method uses industry standards that may fail to take into consideration particular details of performing the task at a given environment or under certain conditions. For example, the industry standards may not account for the fact that an older machine might take more time to load a product onto a pallet. Furthermore, the industry standards may not account for the fact that more time might be required to load a more fragile load or a heavier load. In addition, some industries may even lack industry standards for certain novel motions.

The currently used methods for generating labor standards are impractical. Using industry standards permits the rapid creation of a generic labor standard. However, the generic labor standard may be unrealistic or unusable because it is not customized to a particular task. Similarly, although the use of an industrial engineer to develop a labor standard by using time and motions studies overcomes these shortcomings, these types of standards are time and labor intensive.

SUMMARY OF THE INVENTION

The illustrative embodiments described herein provide a computer implemented method, apparatus, and computer usable program product for creating a labor standard for a task. The process automatically detects event data derived from a continuous video stream, wherein the event data comprises metadata describing a sequence of motions for performing a task, and parses the event data to identify appropriate event data describing a discrete set of motions from the sequence of motions. The process then analyzes, using the analysis server, the discrete set of motions to form a labor standard, wherein the labor standard specifies an optimal manner of performing the discrete set of motions. Thereafter, the process generates a set of recommendations for performing the task efficiently according to the labor standard.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
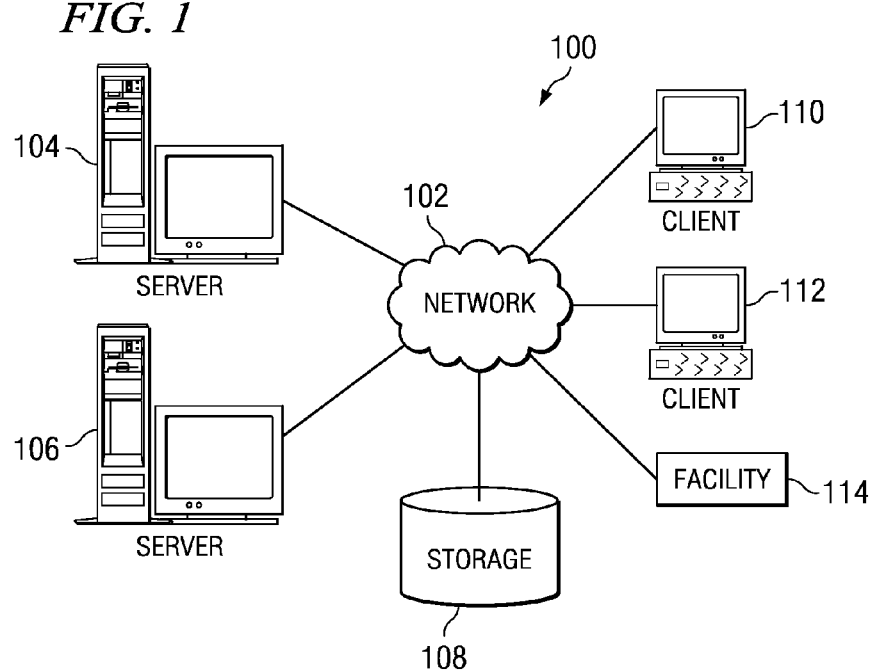
FIG. 1 is a pictorial representation of a network data processing system in which illustrative embodiments may be implemented.
Figure 2:
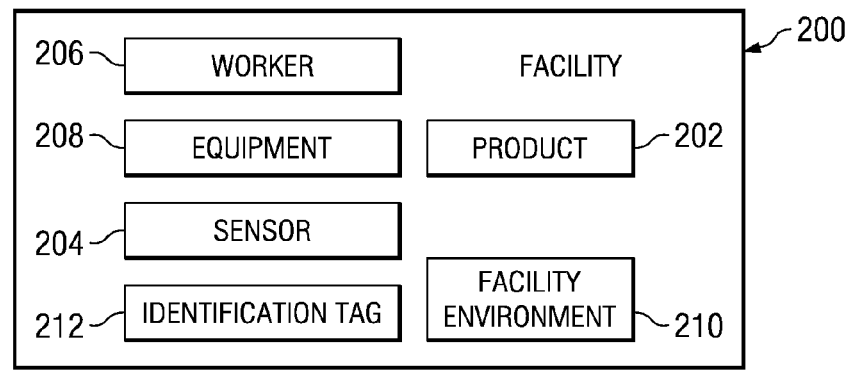
FIG. 2 is a simplified block diagram of a facility in which a set of sensors may be deployed for gathering event data in accordance with an illustrative embodiment.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections such as wire, wireless communication links, or fiber optic cables.

In the depicted example, server 104 and server 106 connect to network 102 along with storage 108. In addition, clients 110 and 112 connect to network 102. Clients 110 and 112 may be, for example, personal computers or network computers. In the depicted example, server 104 provides data, such as boot files, operating system images, and applications to clients 110 and 112. Clients 110 and 112 are clients to server 104 in this example. Network data processing system 100 may include additional servers, clients, and other computing devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 may also be implemented as a number of different types of networks, such as for example, an intranet, a local area network (LAN), or a wide area network (WAN). FIG. 1 is intended as an example, and not as an architectural limitation for the different illustrative embodiments.

Network data processing system 100 also includes facility 114. Facility 114 is a facility in which workers perform one or more tasks of a process. The process may be the creation of a product. Thus, facility 114 may be, for example, a production plant for assembling computers. Workers within facility 114 may be assigned one or more discrete tasks associated with the process of assembling computers and computer components. For example, one worker may be assigned the task of soldering a specific component to a motherboard, whereas another worker may be assigned the task of mounting the circuit board into the computer casing.

The process may also be a service. For example, where facility 114 is a commercial garage, the process may be a tire rotation, oil change, inspection, or any other service that may be rendered by the employees of the garage.

Examples of other products that may be generated at facility 114 include, without limitation, electronics, food items, automotive parts, furniture, and tools. Additional examples of other services that may be provided at facility 114 may include dry cleaning services, haircuts, gift wrapping services, repair services, or any other type of service.

Facility 114 may include one or more facilities, buildings, or other structures, such as parking lots. In addition, facility 114 may include any type of equipment, tool, vehicle, or employee for use in performing a particular process.

FIG. 2 depicts a simplified block diagram of a facility in which illustrative embodiments may be implemented. In this illustrative embodiment in FIG. 2, facility 200 is a facility such as facility 114 in FIG. 1. In this illustrative example in FIG. 2, facility 200 is an industrial facility configured for the creation of product 202. Product 202 may be any tangible object that may be created, assembled, or prepared at facility 200. For example, product 202 may include computers, electronics, toys, meals, buildings, containers, cars or any other object. However, in alternate embodiments, product 202 may be a service product. A service product is a service offered by a service provider, which is generally performed and consumed at a single location. For example, service products may include car washes, oil changes, dry cleaning services, or any other similar types of services. As such, facility 200 may include any location in which tasks are performed to provide product 202. Thus, facility 200 may include, without limitation, residential or commercial garages, construction yards, training facilities, service facilities, barbershops, delivery vehicles, or any other location in which tasks are performed.

Facility 200 includes one or more strategically placed sensors for gathering event data at facility 200. Event data is data and metadata describing actions and events that occur in a facility, such as facility 200. In particular, event data includes audio and video data collected by one or more video cameras deployed at facility 200. For example, event data could describe a worker's performance of a set of motions from a sequence of motions necessary for completing a task, an order for performing the motions, tools and equipment necessary for completing the task, locations for performing the motions, and a time for completing the motions.

To gather event data, facility 200 includes sensor 204. Sensor 204 is a set of one or more sensors deployed at facility 200 for monitoring a location, an object, or a person. Sensor 204 may be located internally and/or externally to facility 200. For example, sensor 204 may be mounted on a wall, a ceiling, equipment, affixed to a worker, or placed on any other strategic location within facility 200 to document the completion of tasks.

Sensor 204 may be any type of sensing device for gathering event data associated with the performance of a particular task at facility 200. Sensor 204 may include, without limitation, a camera, a motion sensor device, a sonar, a sound recording device, an audio detection device, a voice recognition system, a heat sensor, a seismograph, a pressure sensor, a device for detecting odors, scents, and/or fragrances, a radio frequency identification (RFID) tag reader, a global positioning system (GPS) receiver, and/or any other detection device for detecting the presence of a person, equipment, or a vehicle at facility 200.

A heat sensor may be any type of known or available sensor for detecting body heat generated by a human or animal. A heat sensor may also be a sensor for detecting heat generated by a vehicle, such as an automobile or a motorcycle.

A motion detector may include any type of known or available motion detector device. A motion detector device may include, but is not limited to, a motion detector device using a photo-sensor, radar or microwave radio detector, or ultrasonic sound waves.

A motion detector using ultrasonic sound waves transmits or emits ultrasonic sounds waves. The motion detector detects or measures the ultrasonic sound waves that are reflected back to the motion detector. If a human, an animal, or other object moves within the range of the ultrasonic sound waves generated by the motion detector, the motion detector detects a change in the echo of sound waves reflected back. This change in the echo indicates the presence of a human, animal, or other object moving within the range of the motion detector.

In one example, a motion detector device using a radar or microwave radio detector may detect motion by sending out a burst of microwave radio energy and detecting the same microwave radio waves when the radio waves are deflected back to the motion detector. If a human, an animal, or other object moves into the range of the microwave radio energy field generated by the motion detector, the amount of energy reflected back to the motion detector is changed. The motion detector identifies this change in reflected energy as an indication of the presence of the human, the animal, or the other object moving within the motion detectors range.

A motion detector device, using a photo-sensor, detects motion by sending a beam of light across a space into a photo-sensor. The photo-sensor detects when a human, an animal, or object breaks or interrupts the beam of light as the human, the animal, or the object moves in-between the source of the beam of light and the photo-sensor. These examples of motion detectors are presented for illustrative purposes only. A motion detector in accordance with the illustrative embodiments may include any type of known or available motion detector and is not limited to the motion detectors described herein.

A pressure sensor detector may be, for example, a device for detecting a change in weight or mass associated with the pressure sensor. For example, if one or more pressure sensors are imbedded in a sidewalk, Astroturf, or a floor mat, the pressure sensor detects a change in weight or mass when a human or an animal steps on the pressure sensor. The pressure sensor may also detect when a human or an animal steps off of the pressure sensor. In another example, one or more pressure sensors are embedded in a parking lot, and the pressure sensors detect a weight and/or mass associated with a vehicle when the vehicle is in contact with the pressure sensor. A vehicle may be in contact with one or more pressure sensors when the vehicle is driving over one or more pressure sensors and/or when a vehicle is parked on top of one or more pressure sensors.

A camera may be any type of known or available camera, including, but not limited to, a video camera for taking moving video images, a digital camera capable of taking still pictures and/or a continuous video stream, a stereo camera, a web camera, and/or any other imaging device capable of capturing a view of whatever appears within the camera's range for remote monitoring, viewing, or recording of a distant or obscured person, object, or area. A continuous video stream is multimedia captured by a video camera that may be processed to extract event data. The multimedia may be video, audio, or sensor data from collected by sensors. In addition, the multimedia may include any combination of video, audio, and sensor data. The continuous video data stream is constantly generated to capture event data about the environment being monitored.

Various lenses, filters, and other optical devices such as zoom lenses, wide angle lenses, mirrors, prisms, and the like may also be used with the image capture device to assist in capturing the desired view. Devices may be fixed in a particular orientation and configuration, or it may, along with any optical device, be programmable in orientation, light sensitivity level, focus, or other parameters. Programming data may be provided via a computing device, such as server 104 in FIG. 1.

A camera may also be a stationary camera and/or a non-stationary camera. A non-stationary camera is a camera that is capable of moving and/or rotating along one or more directions, such as up, down, left, right, and/or rotate about an axis of rotation. The camera may also be capable of moving to follow or track a person, an animal, or an object in motion. In other words, the camera may be capable of moving about an axis of rotation in order to keep a person or object within a viewing range of the camera lens. In this example, sensor 204 includes non-stationary digital video cameras.

Sensor 204 is coupled to, or in communication with, an analysis server on a data processing system, such as network data processing system 100 in FIG. 1. An exemplary analysis server is illustrated and described in greater detail in FIG. 5, below. The analysis server includes software for analyzing digital images and other data captured by sensor 204 to gather event data in facility 200.

The audio and video data collected by sensor 204 is sent to smart detection software for processing. The smart detection software processes the information to form the event data. The event data includes data and metadata describing events captured by sensor 204. The event data is then sent to the analysis server for additional processing to form a labor standard associated with the generation of product 202.

In the illustrative example in FIG. 2, sensor 204 is configured to monitor worker 206 performing a sequence of motions. Worker 206 is person employed or located at facility 200 and assigned to complete a predefined task. The predefined task is associated with the generation of product 202. The completion of the task may require worker 206 to operate equipment 208. Equipment 208 is objects usable by worker 206 to facilitate the completion of a task. For example, where the task is the assembly electronic devices, worker 206 may be an assembly line worker and equipment 208 may include a soldering iron, a screwdriver, a voltmeter, or any other type of tool or equipment. In another example, where the task is washing a car, then equipment 208 may include a hose, a sponge, a towel, or a squeegee.

Sensor 204 may also be configured to monitor facility environment 210. Facility environment 210 is the ambient conditions of facility 200. Thus, facility environment 210 may include, without limitation, temperature, humidity, level of lighting, level of ambient noise, or any other condition of facility 200 that may have an effect on the completion of tasks by worker 206.

Facility 200 may also include identification tag 212. Identification tag 212 is one or more tags associated with objects or persons in facility 200. Thus, identification tag 212 may be utilized to identify an object or person and to determine a location of the object or person. For example, identification tag 212 may be, without limitation, a bar code pattern, such as a universal product code (UPC) or a European article number (EAN), a radio frequency identification (RFID) tag, or other optical identification tag. Identification tag 212 may be affixed to or otherwise associated with worker 206, equipment 208, sensor 204, or product 202 where product 202 is a tangible object. The type of identification tag implemented in facility 200 depends upon the capabilities of the image capture device and associated data processing system to process the information.

The data processing system, discussed in greater detail in FIG. 3 below, includes associated memory, which may be an integral part, such as the operating memory, of the data processing system or externally accessible memory. Software for tracking objects may reside in the memory and run on the processor. The software in the data processing system maintains a list of all people, sensors, equipment, tools, and any other item of interest in facility 200. The list is stored in a database. The database may be any type of database such as a spreadsheet, a relational database, a hierarchical database or the like. The database may be stored in the operating memory of the data processing system, externally on a secondary data storage device, locally on a recordable medium such as a hard drive, a floppy drive, a CD ROM, a DVD device, remotely on a storage area network, such as storage 108 in FIG. 1, or in any other type of storage device.

The lists are updated frequently enough to provide a dynamic, accurate, real time listing of the people and objects located within facility 200, as well as the events that occur within facility 200. The listing of people, objects, and events may be usable to trigger definable actions. For example, a notification system having access to a list of workers performing specific actions within facility 200 may notify a worker that the currently performed actions fail to comply with existing labor standards. Consequently, a worker may immediately alter the method of performing a discrete set of motions for completing a task so that the task may be completed according to the specified labor standard.

Figure 3:
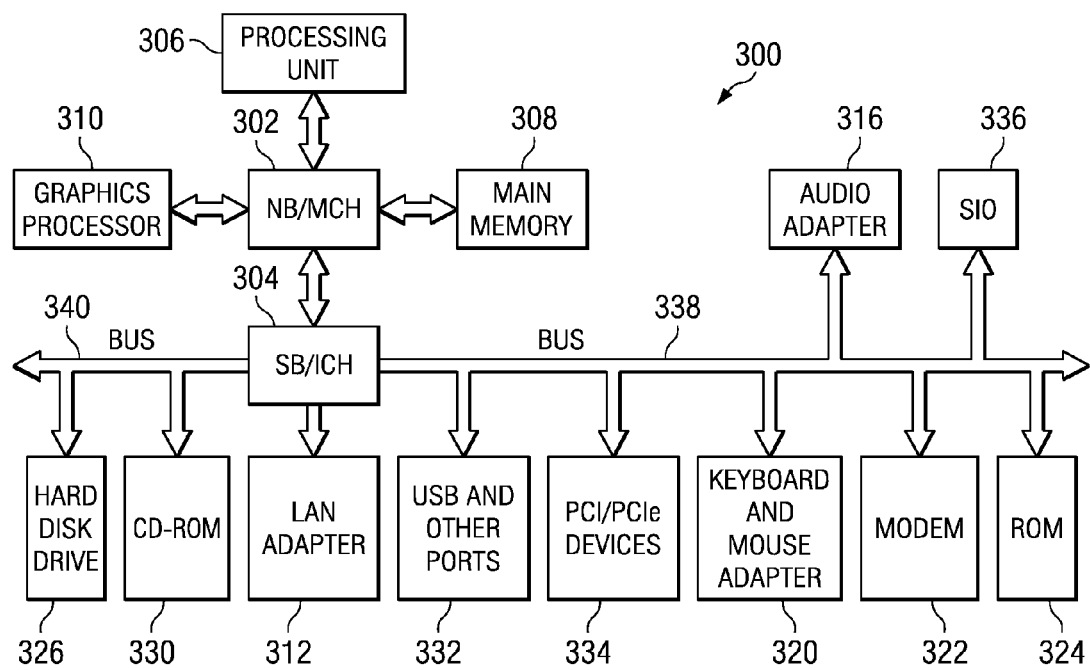
FIG. 3 is a block diagram of a data processing system in which the illustrative embodiments may be implemented.

With reference now to FIG. 3, a block diagram of a data processing system is shown in which illustrative embodiments may be implemented. Data processing system 300 is an example of a computer, such as server 104 and client 110 in FIG. 1, in which computer usable program code or instructions implementing the processes may be located for the illustrative embodiments.

In the depicted example, data processing system 300 employs a hub architecture including a north bridge and memory controller hub (NB/MCH) 302 and a south bridge and input/output (I/O) controller hub (SB/ICH) 304. Processing unit 306, main memory 308, and graphics processor 310 are coupled to north bridge and memory controller hub 302. Processing unit 306 may contain one or more processors and may even be implemented using one or more heterogeneous processor systems. Graphics processor 310 may be coupled to NB/MCH through an accelerated graphics port (AGP), for example.

In the depicted example, local area network (LAN) adapter 312 is coupled to south bridge and I/O controller hub 304 and audio adapter 316, keyboard and mouse adapter 320, modem 322, read only memory (ROM) 324, universal serial bus (USB) and other ports 332, and PCI/PCIe devices 334 are coupled to south bridge and I/O controller hub 304 through bus 338, and hard disk drive (HDD) 326 and CD-ROM 330 are coupled to south bridge and I/O controller hub 304 through bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS). Hard disk drive 326 and CD-ROM 330 may use, for example, an integrated drive electronics (IDE) or serial advanced technology attachment (SATA) interface. A super I/O (SIO) device 336 may be coupled to south bridge and I/O controller hub 304.

An operating system runs on processing unit 306 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the JAVA™ programming system, may run in conjunction with the operating system and provides calls to the operating system from JAVA™ programs or applications executing on data processing system 300. JAVA™ and all JAVA™-based trademarks are trademarks of Sun Microsystems, Inc. in the United States, other countries, or both.

Instructions for the operating system, the object-oriented programming system, and applications or programs are located on storage devices, such as hard disk drive 326, and may be loaded into main memory 308 for execution by processing unit 306. The processes of the illustrative embodiments may be performed by processing unit 306 using computer implemented instructions, which may be located in a memory such as, for example, main memory 308, read only memory 324, or in one or more peripheral devices.

In some illustrative examples, data processing system 300 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. Memory may be, for example, main memory 308 or a cache such as found in north bridge and memory controller hub 302. A processing unit may include one or more processors or CPUs. The depicted examples in FIGS. 1 and 3 and above-described examples are not meant to imply architectural limitations. For example, data processing system 300 may also be a tablet computer, a laptop computer, or a telephone device in addition to taking the form of a PDA.

The use of labor standards at facilities, such as facility 114 in FIG. 1, optimizes the performance of repetitive tasks. It will be appreciated by one skilled in the art that the words "optimize", "optimization" and other related terms are terms of art that refer to improvements in speed and/or efficiency, and do not purport to indicate that a process has achieved, or is capable of achieving, an "optimal" or perfectly speedy and/or perfectly efficient state. Optimization of the manner in which a task is completed may, for example, reduce the amount of time required to complete the task, decrease the number of people needed for performing a task, increase the amount of revenue generated from a process, or decrease the amount of money spent to complete a process.

Thus, an optimal manner for performing a discrete set of motions is the manner in which the discrete set of motions is performed in order to satisfy one or more specified criteria or conditions. The predefined criteria or conditions may be, for example, a cost or a time. Changing conditions may redefine the optimal manner of performing the discrete set of motions. For example, to minimize costs, the optimal manner for workers to wash a car is the manner of washing cars the uses the least amount of supplies. However, in special circumstances, such as on days where a long line of customers are waiting to have their cars washed, the optimal manner of washing cars is the manner of washing cars that allows workers to wash the cars in the least amount of time, irrespective of the amount of supplies used.

The optimal manner may be an optimal sequence for performing a discrete set of motions. An optimal sequence for performing a discrete set of motions is the sequence of performing each motion in the discrete set of motions that satisfies a predefined condition. The predefined condition may include, without limitation, a cost, a time, or an acceptable rate of failure. For example, the task may be the attachment of a metal bracket to a piece of wood. The predefined condition may state that the bracket is to be attached in the least amount of time. Thus, the optimal sequence for performing this task may require a worker to pick up a screw with the non-dominant hand while simultaneously picking up a screwdriver with the dominant hand. Further, the optimal sequence may require the worker to simultaneously move both the screwdriver and the screw to the bracket, and then tighten the screw with the screwdriver. If, however, the worker picked up the screw with the dominant hand, then the worker would have had to switch the screw from the dominant hand to the non-dominant hand in order to retrieve a screwdriver before screwing the screw. This sequence of motions requires the worker to perform additional motions, thereby increasing the amount of time to perform the task. As such, where the predefined condition requires the worker to attach the bracket in the shortest amount of time, the first sequence of motions is the optimal sequence for performing a discrete set of motions to complete the task.

Therefore, the aspects of the illustrative embodiments recognize that it is advantageous to establish a labor standard that takes into account as much information regarding the manner in which workers perform a sequence of motions to complete a task. A labor standard is a detailed set of instructions specifying an optimal manner for performing a discrete set of motions to complete a task. The labor standard may specify an amount of time to complete one or more discrete sets of motions that form the sequence of motions. In addition, the labor standards may specify a type of person for completing a task, or the manner in which a particular tool is used during the completion of the task. Further, the labor standards may specify an optimal sequence for performing the discrete set of motions.

A labor standard may also define a fatigue factor. A fatigue factor is an indicator of a worker's acceptable level of decreased productivity experienced during the course of completing repetitive tasks. For example, muscle fatigue and lack of concentration may prevent a worker from performing a discrete set of motions in the time allocated by the labor standard. A fatigue factor may be used to modify the amount of time allocated to a worker to complete the discrete set of tasks. For example, a worker moving boxes from one pallet to another may be allocated twenty seconds to move a box in the first hour of work. The fatigue factor may be used to modify the labor standard to allow the worker thirty seconds to move each box by the fourth hour of work.

Therefore, the illustrative embodiments described herein provide a computer implemented method, apparatus, and computer usable program product for creating a labor standard for a task. The process automatically detects event data derived from a continuous video stream, wherein the event data comprises metadata describing a sequence of motions for performing a task, and parses the event data to identify appropriate event data describing a discrete set of motions from the sequence of motions. The process then analyzes, using the analysis server, the discrete set of motions to form a labor standard, wherein the labor standards specify an optimal manner of performing the discrete set of motions. Thereafter, the process generates a set of recommendations for performing the task efficiently according to the labor standard.

Processing or parsing event data may include, but is not limited to, formatting the event data for utilization and/or analysis in one or more data models, comparing the event data to a data model and/or filtering the event data for relevant data elements to identify the appropriate event data. Appropriate event data is event data that describes the motions that form the discrete set of motions used to generating a labor standard. Appropriate event data may be determined based upon a predefined set of motions. For example, a task may require a worker to remove a nail from a pouch of nails, align the nail to a particular point on a piece of wood, and drive the nail into the wood with a hammer wielded by the other hand. If a worker completes the task in the manner described above, then the event data describing this predefined set of motions is appropriate event data. If, however, the worker accidentally drops the hammer before the nail is driven into the piece of wood, then the event data describing the motions associated with the dropping and recovering of the hammer are not appropriate event data.

Event data collected from a set of sensors in a detection system is used to form a labor standard for performing a task. The set of sensors, which may be one or more sensors, is configured to monitor an environment, such as facility 200 in FIG. 2. Event data is data relating to the completion of tasks by workers and is gathered and analyzed in real time. Event data is data that has been processed or filtered for analysis in a data model. For example, a data model may not be capable of analyzing raw or unprocessed video images captured by a camera. The video images may need to be processed into data and/or metadata describing the contents of the video images before a data model may be used to organize, structure, or otherwise manipulate data and/or metadata. The video images converted to data and/or metadata that are ready for processing or analysis in a set of data models is an example of event data.

The event data is analyzed using one or more data models in a set of data models to automatically detect event data derived from a continuous video stream. The event data may describe, for example, the motions performed by a worker to complete a task, the tools and equipment used in performing the motions, or the ambient conditions existing at the time the worker was completing the task. The event data may be further processed in one or more data models in the set of data models to form a labor standard.

A set of data models includes one or more data models. A data model is a model for structuring, defining, organizing, imposing limitations or constraints, and/or otherwise manipulating data and metadata to produce a result. A data model may be generated using any type of modeling method or simulation including, but not limited to, a statistical method, a data mining method, a causal model, a mathematical model, a behavioral model, a psychological model, a sociological model, or a simulation model.

As used herein, the term "set" includes one or more. For example, a set of motion detectors may include a single motion detector or two or more motion detectors. In one embodiment, the detectors include a set of one or more cameras located externally to the facility. Video images received from the set of cameras are used for gathering event data occurring within a facility, such as facility 200 in FIG. 2.

Figure 4:
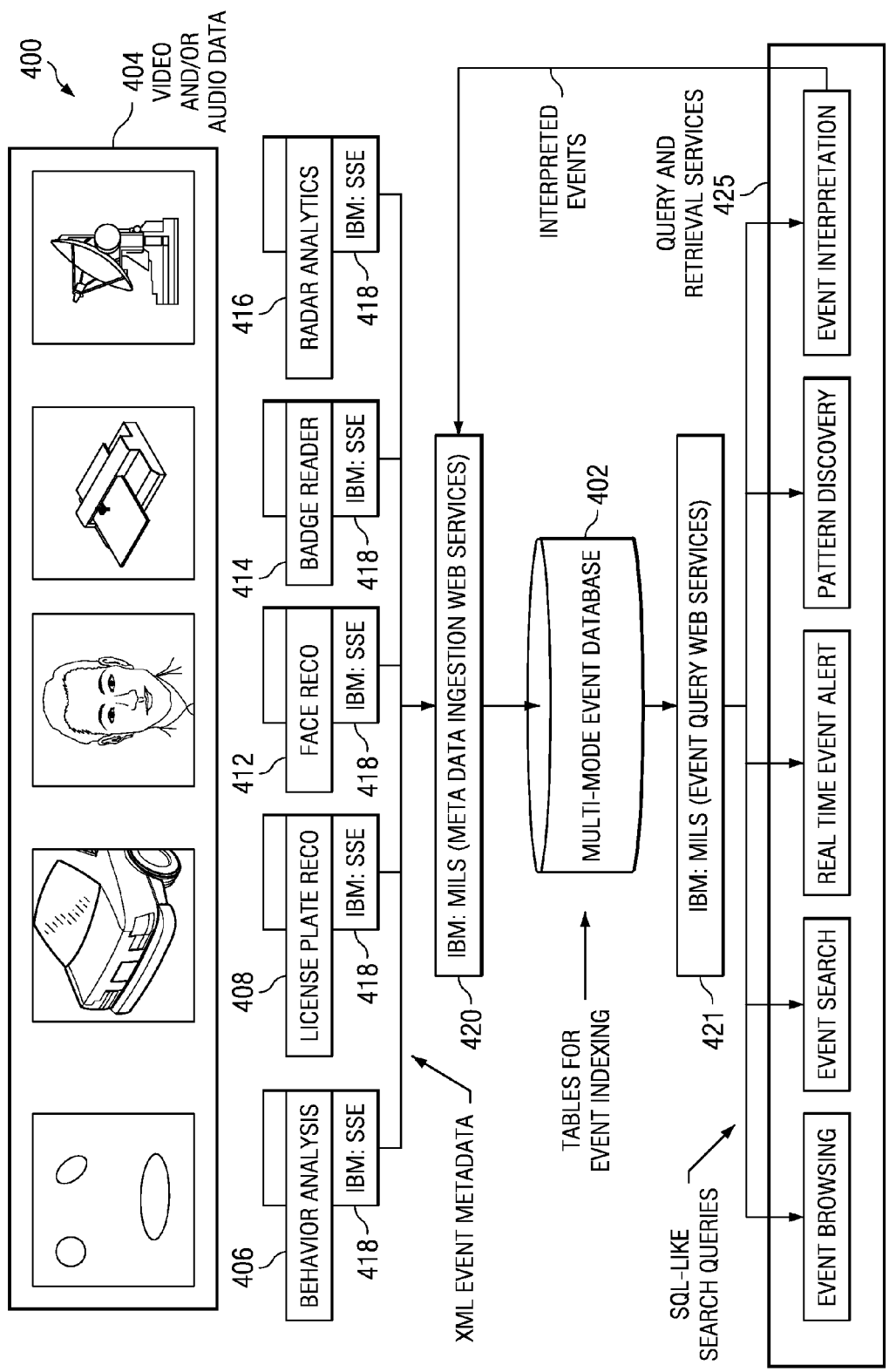
FIG. 4 is a diagram of a smart detection system for generating event data in accordance with an illustrative embodiment of the present invention.

Turning now to FIG. 4, a diagram of a smart detection system is depicted in accordance with an illustrative embodiment. System 400 is a system, such as network data processing system 100 in FIG. 1. System 400 incorporates multiple independently developed event analysis technologies in a common framework. An event analysis technology is a collection of hardware and/or software usable to capture and analyze event data. For example, an event analysis technology may be the combination of a video camera and facial recognition software. Images of faces captured by the video camera are analyzed by the facial recognition software to identify the subjects of the images.

Smart detection, also known as smart surveillance, is the use of computer vision and pattern recognition technologies to analyze detection data gathered from situated cameras and microphones. The analysis of the detection data generates events of interest in the environment. For example, an event of interest at a departure drop off area in an airport includes "cars that stop in the loading zone for extended periods of time." As smart detection technologies have matured, they have typically been deployed as isolated applications, which provide a particular set of functionalities.

Smart detection system 400 is a smart detection system architecture for analyzing video images captured by a camera and/or audio captured by an audio detection device. Smart detection system 400 includes software for analyzing audio/video data 404. In this example, smart detection system 400 processes audio/video data 404 for an industrial worker into data and metadata to form query and retrieval services 425. Smart detection system 400 may be implemented using any known or available software for performing voice analysis, facial recognition, license plate recognition, and sound analysis. In this example, smart detection system 400 is implemented as IBM® smart surveillance system (S3) software.

An audio/video capture device is any type of known or available device for capturing video images and/or capturing audio. The audio/video capture device may be, but is not limited to, a digital video camera, a microphone, a web camera, or any other device for capturing sound and/or video images. For example, the audio/video capture device may be implemented as sensor 204 in FIG. 2.

Audio/video data 404 is detection data captured by the audio/video capture devices. Audio/video data 404 may be a sound file, a media file, a moving video file, a media file, a still picture, a set of still pictures, or any other form of image data and/or audio data. Audio/video data 404 may also be referred to as detection data. Audio/video data 404 may include images of a person's face, an image of a part or portion of a car, an image of a license plate on a car, and/or one or more images showing a person's behavior. For example, a set of images corresponding to the motions undertaken to complete a task may be captured, processed, and analyzed to form a labor standard.

In this example, the architecture of smart detection system 400 is adapted to satisfy two principles. 1) Openness: The system permits integration of both analysis and retrieval software made by third parties. In one embodiment, the system is designed using approved standards and commercial off-the-shelf (COTS) components. 2) Extensibility: The system should have internal structures and interfaces that will permit the functionality of the system to be extended over a period of time.

The architecture enables the use of multiple independently developed event analysis technologies in a common framework. The events from all these technologies are cross indexed into a common repository or multi-mode event database 402 allowing for correlation across multiple audio/video capture devices and event types.

Smart detection system 400 includes the following illustrative technologies integrated into a single system. License plate recognition technology 408 may be deployed at the entrance to a facility where license plate recognition technology 408 catalogs a license plate of each of the arriving and departing vehicles in a parking lot or roadway associated with the facility. For example, license plate recognition technology 408 may be implemented to track movement of vehicles used in the performance of tasks, such as delivery of objects or people from one location to another.

Behavior analysis technology 406 detects and tracks moving objects and classifies the objects into a number of predefined categories. As used herein, an object may be a human worker or an item, such as equipment or tools usable by the worker to perform a given task. Behavior analysis technology 406 could be deployed on various cameras overlooking a parking lot, a perimeter, or inside a facility.

Face detection/recognition technology 412 may be deployed at entry ways to capture and recognize faces. Badge reading technology 414 may be employed to read badges. Radar analytics technology 416 may be employed to determine the presence of objects.

Events from access control technologies can also be integrated into smart detection system 400. The data gathered from behavior analysis technology 406, license plate recognition 408, Face detection/recognition technology 412, badge reader technology 414, radar analytics technology 416, and any other video/audio data received from a camera or other video/audio capture device is received by smart detection system 400 for processing into query and retrieval services 425.

The events from all the above surveillance technologies are cross indexed into a single repository, such as multi-mode event database 402. In such a repository, a simple time range query across the modalities will extract license plate information, vehicle appearance information, badge information, and face appearance information, thus permitting an analyst to easily correlate these attributes. The architecture of smart detection system 400 also includes one or more smart surveillance engines (SSEs) 418, which house event detection technologies.

Smart detection system 400 further includes middleware for large scale surveillance (MILS) 420 and 421, which provides infrastructure for indexing, retrieving, and managing event metadata.

In this example, audio/video data 404 is received from a variety of audio/video capture devices, such as sensor 204 in FIG. 2, and processed in smart surveillance engine 418. Each smart surveillance engine 418 is operable to generate real time alerts and generic event metadata. The metadata generated by smart surveillance engine 418 may be represented using extensible markup language (XML). The XML documents include a set of fields which are common to all engines and others which are specific to the particular type of analysis being performed by smart surveillance engine 418. In this example, the metadata generated by smart surveillance engine 418 is transferred to a backend middleware for large scale surveillance 420. This may be accomplished via the use of, e.g., web services data ingest application program interfaces (APIs) provided by middleware for large scale surveillance 420. The XML metadata is received by middleware for large scale surveillance 420 and indexed into predefined tables in multi-mode event database 402. This may be accomplished using, for example, and without limitation, the DB2™ XML extender, if an IBM® DB2™ database is employed. This permits for fast searching using primary keys. Middleware for large scale surveillance 421 provides a number of query and retrieval services 425 based on the types of metadata available in the database. Query and retrieval services 425 may include, for example, event browsing, event search, real time event alert, or pattern discovery event interpretation. Each event has a reference to the original media resource, such as, without limitation, a link to the video file. This allows a user to view the video associated with a retrieved event.

Smart detection system 400 provides an open and extensible architecture for smart video surveillance. smart surveillance engine 418 preferably provide a plug and play framework for video analytics. The event metadata generated by smart surveillance engine 418 may be sent to multi-mode event database 402 as XML files. Web services API's in middleware for large scale surveillance 420 permit for easy integration and extensibility of the metadata. Query and retrieval services 425, such as, for example, event browsing and real time alerts, may use structure query language (SQL) or similar query language through web services interfaces to access the event metadata from multi-mode event database 402.

The smart surveillance engine (SSE) 418 may be implemented as a C++ based framework for performing real time event analysis. Smart surveillance engine 418 is capable of supporting a variety of video/image analysis technologies and other types of sensor analysis technologies. Smart surveillance engine 418 provides at least the following support functionalities for the core analysis components. The support functionalities are provided to programmers or users through a plurality of interfaces employed by smart surveillance engine 418. These interfaces are illustratively described below.

Standard plug-in interfaces are provided. Any event analysis component, which complies with the interfaces defined by smart surveillance engine 418 can be plugged into smart surveillance engine 418. The definitions include standard ways of passing data into the analysis components and standard ways of getting the results from the analysis components. Extensible metadata interfaces are provided. Smart surveillance engine 418 provides metadata extensibility. For example, consider a behavior analysis application which uses detection and tracking technology. Assume that the default metadata generated by this component is object trajectory and size. If the designer now wishes to add color of the object into the metadata, smart surveillance engine 418 enables this by providing a way to extend the creation of the appropriate XML structures for transmission to the backend (MILS) system 420.

Real time alerts are highly application-dependent. For example, while a person loitering may require an alert in one application, the absence of a guard at a specified location may require an alert in a different application. Smart surveillance engine 418 provides an easy real time alert interfaces mechanism for developers to plug-in for application specific alerts. Smart surveillance engine 418 provides standard ways of accessing event metadata in memory and standardized ways of generating and transmitting alerts to the backend (MILS) system 420.

In many applications, users will need the use of multiple basic real time alerts in a spatio-temporal sequence to compose an event that is relevant in the user's application context. Smart surveillance engine 418 provides a simple mechanism for composing compound alerts via compound alert interfaces. In many applications, the real time event metadata and alerts are used to actuate alarms, visualize positions of objects on an integrated display, and control cameras to get better surveillance data. Smart surveillance engine 418 provides developers with an easy way to plug-in actuation modules, which can be driven from both the basic event metadata and by user defined alerts using real time actuation interfaces.

Using database communication interfaces, smart surveillance engine 418 also hides the complexity of transmitting information from the analysis engines to the multi-mode event database 402 by providing simple calls to initiate the transfer of information.

The IBM middleware for large scale surveillance (MILS) 420 and 421 may include a J2EE™ frame work built around IBM's DB2™ and IBM WebSphere™ application server platforms. Middleware for large scale surveillance 420 supports the indexing and retrieval of spatio-temporal event metadata. Middleware for large scale surveillance 420 also provides analysis engines with the following support functionalities via standard web service interfaces using XML documents.

Middleware for large scale surveillance 420 and 421 provide metadata ingestion services. These are web service calls, which allow an engine to ingest events into middleware for large scale surveillance 420 and 421 system. There are two categories of ingestion services. 1) Index Ingestion Services: This permits for the ingestion of metadata that is searchable through SQL like queries. The metadata ingested through this service is indexed into tables, which permit content based searches, such as provided by middleware for large scale surveillance 420. 2) Event Ingestion Services: This permits for the ingestion of events detected in smart surveillance engine 418, such as provided by middleware for large scale surveillance 421. For example, a loitering alert that is detected can be transmitted to the backend along with several parameters of the alert. These events can also be retrieved by the user but only by the limited set of attributes provided by the event parameters.

Middleware for large scale surveillance 420 and/or 421 provides schema management services. Schema management services are web services which permit a developer to manage their own metadata schema. A developer can create a new schema or extend the base middleware for large scale surveillance schema to accommodate the metadata produced by their analytical engine. In addition, system management services are provided by middleware for large scale surveillance 420 and/or 421.

The schema management services of middleware for large scale surveillance 420 and 421 provide the ability to add a new type of analytics to enhance situation awareness through cross correlation. For example, a labor standard for creating a product or performing a service may change over time. These changes may be brought about by the development of new equipment, tools, or an evolution of the product or service. Thus, it is important to permit smart detection system 400 to add new types of analytics and cross correlate the existing analytics with the new analytics. To add/register a new type of sensor and/or analytics to increase situation awareness, a developer can develop new analytics and plug them into smart surveillance engine 418, and employ middleware for large scale surveillance schema management service to register new intelligent tags generated by the new smart surveillance engine analytics. After the registration process, the data generated by the new analytics is immediately available for cross correlating with existing index data.

System management services provide a number of facilities needed to manage smart detection system 400 including: 1) Camera Management Services: These services include the functions of adding or deleting a camera from a middleware for large scale surveillance system, adding or deleting a map from a middleware for large scale surveillance system, associating a camera with a specific location on a map, adding or deleting views associated with a camera, assigning a camera to a specific middleware for large scale surveillance server and a variety of other functionalities needed to manage the system. 2) Engine Management Services: These services include functions for starting and stopping an engine associated with a camera, configuring an engine associated with a camera, setting alerts on an engine and other associated functionalities. 3) User Management Services: These services include adding and deleting users to a system, associating selected cameras to a viewer, associating selected search and event viewing capacities with a user and associating video viewing privileges with a user. 4) Content Based Search Services: These services permit a user to search through an event archive using a plurality of types of queries.

For the content based search services (4), the types of queries may include: A) Search by Time retrieves all events from query and retrieval services 425 that occurred during a specified time interval. B) Search by Object Presence retrieves the last one hundred events from a live system. C) Search by Object Size retrieves events where the maximum object size matches the specified range. D) Search by Object Type retrieves all objects of a specified type. E) Search by Object Speed retrieves all objects moving within a specified velocity range. F) Search by Object Color retrieves all objects within a specified color range. G) Search by Object Location retrieves all objects within a specified bounding box in a camera view. H) Search by Activity Duration retrieves all events from query and retrieval services 425 with durations within the specified range. I) Composite Search combines one or more of the above capabilities. Other system management services may also be employed.

Figure 5:
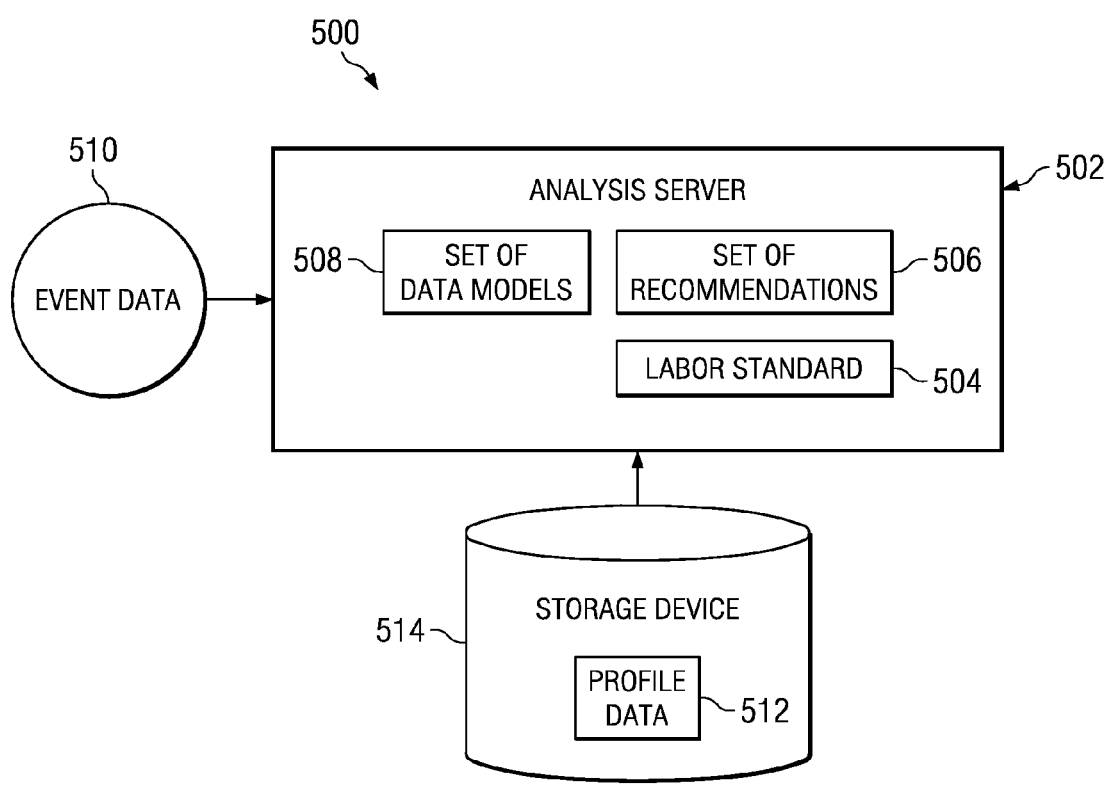
FIG. 5 is a block diagram of a data processing system for generating labor standards in accordance with an illustrative embodiment.

Referring now to FIG. 5, a block diagram of a data processing system for analyzing event data for use in generating a set of recommendations for performing a task according to a labor standard is shown in accordance with an illustrative embodiment. Data processing system 500 is a data processing system, such as data processing system 100 in FIG. 1 and data processing system 300 in FIG. 3.

Analysis server 502 is any type of known or available server for analyzing event data to form labor standard 504. Labor standard 504 is a model, set of definitions, suggestions, or parameters for performing a discrete set of motions for completing a task. Labor standard 504 may include specifications for performing a discrete set of motions. The specifications may require that the set of motions be performed in a particular order, within a predefined amount of time, using a specified tool or equipment, or in some other predefined manner. Labor standard 504 may specify working conditions that may promote the productivity of a worker.

For example, a worker assigned a task to shovel dirt may be provided with a large shovel under the assumption that a larger shovel reduces the number of repetitive shoveling motions that the worker is required to make in any given day. However, the increased weight of each shovelful of dirt may quickly tire the worker out and prevent the worker from completing the task altogether. A worker provided with a smaller shovel may be required to perform more shoveling motions, but may be able to complete the task.

Analysis server 502 is also operable to generate a set of recommendations 506 for performing a task efficiently according to the labor standard. Set of recommendations 506 is one or more recommendations that may be generated in response to analyzing the event data describing the performance of a discrete set of motions for completing a task. Set of recommendations 506 may take the form of text, graphics, video clips, or diagrams illustrating the proper method of performing a discrete set of motions to complete a task. In addition, set of recommendations 506 may include statistics describing, for example, the amount of time allocated for performing each motion from the discrete set of motions, the optimum ambient conditions to promote completion of the task, and an acceptable fatigue factor.

Set of recommendations 506 may be generated by at least one of analysis server 502 or a human user. In other words, set of recommendations 506 may be generated by either analysis server 502 or a human user, or both.

In one embodiment, set of recommendations 506 may be presented directly to a worker at a facility, such as worker 206 in facility 200 in FIG. 2. For example, a worker performing a discrete set of motions to complete a task may be monitored by a video camera. Analysis server 502, analyzing the event data derived from the video data captured by the video camera may determine that the worker is improperly performing a discrete set of motions to complete the task. Analysis server 502 may generate a notice, which may take the form of an audible or visual cue, notifying the worker that the worker is not complying with labor standard 504.

Performing a task efficiently according to the labor standard means performing a discrete set of motions specified by the labor standard within the prescribed limitations. For example, if the labor standard specifies that a task is to be completed within a predefined amount of time, then performing the task efficiently according to the labor standard requires that the worker completes the task within the predefined amount of time.

Analysis server 502 may be a server, such as server 104 in FIG. 1 or data processing system 300 in FIG. 3. Analysis server 502 includes set of data models 508 for detecting, parsing, and analyzing event data that form a discrete set of motions. Set of data models 508 is one or more data models created a priori or pre-generated for use in processing event data 510 to form labor standard 504. Set of data models 508 includes one or more data models for mining event data, identifying events of interest, and generating statistics associated with the completion of tasks. Set of data models 508 may be generated using statistical, data mining, and simulation or modeling techniques. In this example, set of data models 508 includes, but is not limited to, unifying data models, system data models, event data models, and/or user data models. These data models are discussed in greater detail in FIG. 6 below.

Profile data 512 is data relating to one or more workers of a facility, such as facility 200 in FIG. 2. For example, profile data 512 may relate to a worker's physical characteristics, such as height, weight, and age. Profile data 512 may also include information relating to other attributes, such as a work schedule, known physical limitations that may prevent the performance of certain tasks, lists of certifications obtained, and previous job descriptions. In other words, profile data 512, as it relates to workers of a facility, includes any data that could be taken into consideration in identifying workers for performing certain tasks. Profile data 512 may also include a customized labor standard associated with individual workers that accounts for the strengths and weaknesses of each worker. For example, an able bodied worker may have a stricter labor standard, whereas a worker having suffered an injury may have a more relaxed labor standard that permits more time to complete tasks.

Profile data 512 is stored in storage device 514. Storage device 514 is one or more storage devices for storing data, such as storage 108 in FIG. 1 and hard disk drive 326 in FIG. 3.

Event data 510 is data or metadata describing the manner in which workers complete tasks in a particular location, such as facility 200 in FIG. 2. Processing event data 510 may include, but is not limited to, parsing event data 510 for appropriate data elements and, in some instances, combining event data 510 with profile data 512. In addition, processing event data 510 may include comparing event data 510 to baseline or comparison models, and/or formatting event data 510 for utilization and/or analysis in one or more data models in a set of data models 508 to form a labor standard. Event data 510 is analyzed and/or further processed using one or more data models in a set of data models 508 to form a labor standard.

Analysis server 502 analyzes event data 510 describing a discrete set of motions to form labor standard 504. In one embodiment, analysis server 502 performs this analysis by collecting statistics relating to the performance of a discrete set of motions by various workers repetitively completing the same task to form a generic labor standard. In another embodiment, analysis server 502 performs the analysis of event data 510 relating to the performance of a task by a single worker for generating a labor standard specific as to that particular worker.

Analysis server 502 may also determine an acceptable fatigue factor for the completion of a particular task. Analysis server 502 may determine this fatigue factor by analyzing event data 510 associated with repetitive performance of a discrete set of motions by one or more workers at a facility. Analysis server 502 may generate statistics describing, for example, an optimum amount of time for breaks based on an amount of time worked. Or, in another embodiment, analysis server 502 may generate statistics indicating an acceptable decrease in productivity in relation to hours worked, products created, ambient condition of a facility, or any other factor.

Figure 6:
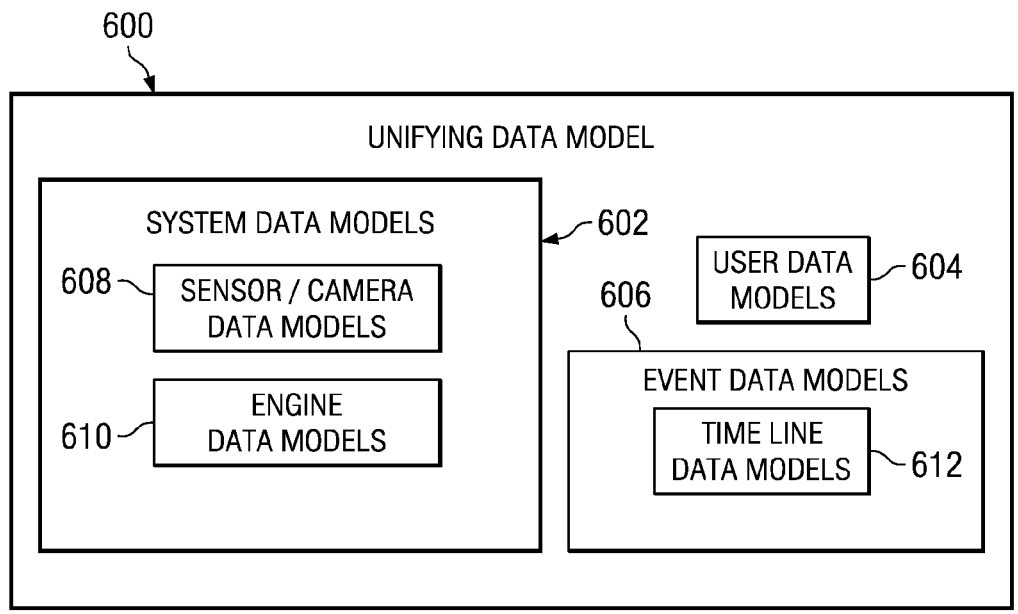
FIG. 6 is a block diagram of a unifying data model for processing event data in accordance with an illustrative embodiment.

Turning now to FIG. 6, a block diagram of a unifying data model for processing event data is depicted in accordance with an illustrative embodiment. The event data generated by a smart detection system may be processed by one or more data models in a set of data models, such as set of data models 508 in FIG. 5, to identify patterns in the events. Unifying data model 600 is an example of a data model for processing event data.

In this example, unifying data model 600 has three types of data models, namely, 1) system data models 602, which captures the specification of a given monitoring system, including details like geographic location of the system, number of cameras deployed in the system, physical layout of the monitored space, and other details regarding the facility; 2) user data models 604 models users, privileges, and user functionality; and 3) event data models 606, which captures the events that occur in a specific sensor or zone in the monitored space. Each of these data models is described below.

System data models 602 has a number of components. These may include sensor/camera data models 608. The most fundamental component of this sensor/camera data models 608 is a view. A view is defined as some particular placement and configuration, such as a location, orientation, and/or parameters, of a sensor. In the case of a camera, a view would include the values of the pan, tilt, and zoom parameters, any lens and camera settings, and position of the camera. A fixed camera can have multiple views. The view "Id" may be used as a primary key to distinguish between events being generated by different sensors. A single sensor can have multiple views. Sensors in the same geographical vicinity are grouped into clusters, which are further grouped under a root cluster. There is one root cluster per middleware for large scale surveillance server.

Engine data models 610 provides a comprehensive security solution which utilizes a wide range of event detection technologies. Engine data models 610 captures at least some of the following information about the analytical engines: Engine Identifier: A unique identifier assigned to each engine; Engine Type: This denotes the type of analytic being performed by the engine, for example, face detection, behavior analysis, and/or LPR; and Engine Configuration: This captures the configuration parameters for a particular engine.

User data models 604 captures the privileges of a given user. These may include selective access to camera views; selective access to camera/engine configuration and system management functionality; and selective access to search and query functions.

Event data models 606 represents the events that occur within a space that may be monitored by one or more cameras or other sensors. Event data models may incorporate time line data models 612 for associating the events with a time. By associating the events with a time, an integrated event may be defined. An integrated event is an event that may include multiple sub-events. Time line data models 612 uses time as a primary synchronization mechanism for events that occur in the real world, which is monitored through sensors. The basic middleware for large scale surveillance schema allows multiple layers of annotations for a given time span.

Figure 7:
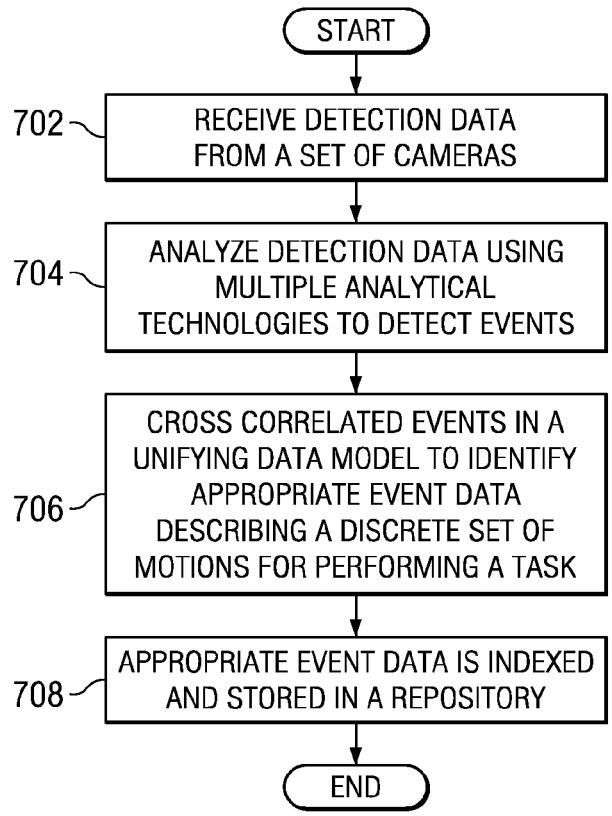
FIG. 7 is a block diagram of data flow through a smart detection system in accordance with an illustrative embodiment.

Turning now to FIG. 7, a process for generating event data by a smart detection system is depicted in accordance with an illustrative embodiment. The process in FIG. 7 may be implemented by a smart detection system, such as smart detection system 400 in FIG. 4.

The process begins by receiving detection data from a set of cameras (step 702). The process analyzes the detection data using multiple analytical technologies to detect events (step 704). The multiple technologies may include, for example, a behavior analysis engine, a license plate recognition engine, a face recognition engine, a badge reader engine, and/or a radar analytic engine.

Events are cross correlated in a unifying data model to identify appropriate event data describing a discrete set of motions for performing a task (step 706). Cross correlating provides integrated situation awareness across the multiple analytical technologies. The cross correlating may include correlating events to a time line to associate events to define an integrated event. The appropriate event data is indexed and stored in a repository, such as a database (step 708) with the process terminating thereafter.

In the example in FIG. 7, the database can be queried to determine an integrated event that matches the query. This includes employing cross correlated information from a plurality of information technologies and/or sources. New analytical technologies may also be registered. The new analytical technologies can employ models and cross correlate with existing analytical technologies to provide a dynamically configurable surveillance system.

In this example, detection data is received from a set of cameras. However, in other embodiments, detection data may come from other detection devices, such as, without limitation, a badge reader, a microphone, a motion detector, a heat sensor, or a radar.

Figure 8:
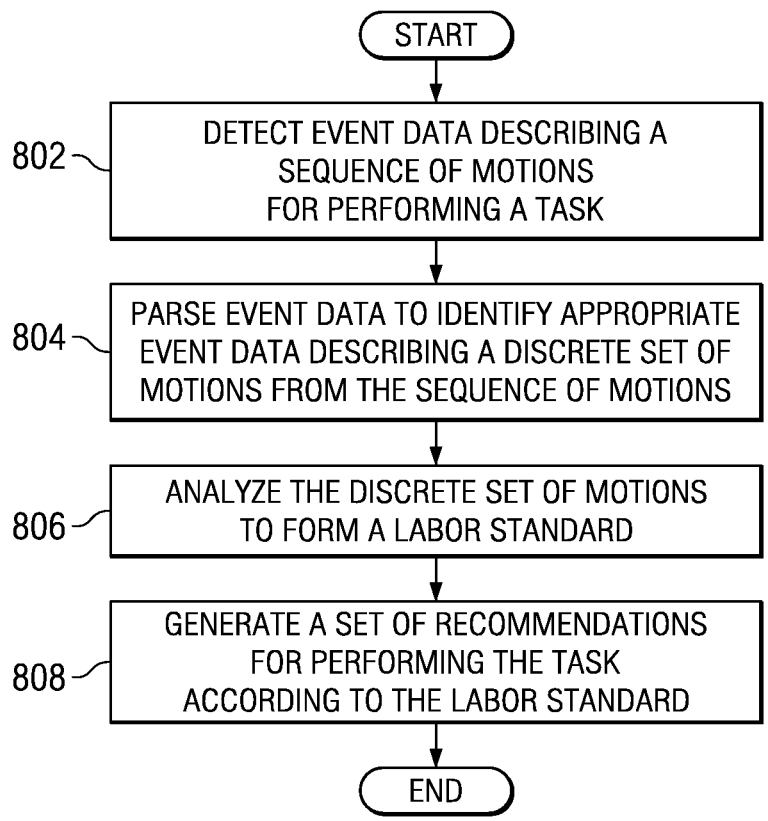
FIG. 8 is a flowchart of a process for generating labor standards in accordance with an illustrative embodiment.

Turning now to FIG. 8, a process for generating a set of recommendations for performing a task according to a labor standard is depicted in accordance with an illustrative embodiment. This process may be implemented by an analysis server, such as analysis server 502 in FIG. 5.

The process begins by detecting event data describing a sequence of motions for performing a task (step 802). The data, which may originate from a set of sensors, such as sensors 204 in FIG. 2, is stored in a data storage device. The data storage device may be a relational database, a multimodal database, or any other data storage device. The event data includes metadata describing events occurring at a facility, such as facility 200 in FIG. 2. Event data may include data describing the manner in which tasks are completed. For example, the event data may describe the various motions performed by a worker to complete a task, the type of tools or equipment that may have been used and the manner in which they were used.

The process then parses the event data to identify appropriate event data describing a discrete set of motions from the sequence of motions (step 804). Thereafter, the process analyzes the discrete set of motions to form a labor standard (step 806). Once the labor standard is formed, the process generates a set of recommendations for performing the task according to the labor standards (step 808) and the process terminates thereafter.

The flowcharts and block diagrams in the different depicted embodiments illustrate the architecture, functionality, and operation of some possible implementations of methods, apparatus, and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer implemented method, apparatus, and computer usable program product for creating a labor standard for a task. The process automatically detects event data derived from a continuous video stream, wherein the event data comprises metadata describing a sequence of motions for performing a task, and parses the event data to identify appropriate event data describing a discrete set of motions from the sequence of motions. The process then analyzes, using the analysis server, the discrete set of motions to form a labor standard, wherein the labor standards specify a preferred manner of performing the discrete set of motions. Thereafter, the process generates a set of recommendations for performing the task efficiently according to the labor standard, which may then result in increased profits, employee productivity, and employee satisfaction Using the method and apparatus disclosed herein, labor standards may be generated from event data captured by a set of sensors. The event data includes video data derived from a continuous video stream. The use of an analysis server to analyze the event data to form the labor standards obviates the need for a user to analyze workers performing a sequence of motions for completing a task. Additionally, the process described above may be used to provide instantaneous feedback in the form of recommendations to assist a user in performing a task according to the labor standards. Further, labor standards derived in this manner are tailored for a specific process and takes into account factors such as worker fatigue, equipment malfunction, or other occurrences that may reduce the effectiveness of a worker's ability to complete a task.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a task, the computer implemented method comprising:
   generating, by multiple audio and video capture devices, continuous audio and video stream data representative of a particular person performing a sequence of motions to complete the task;
   automatically detecting event data by a computer of a smart detection system from the multiple audio and video capture devices including the generated continuous audio and video stream data, wherein the event data comprises metadata describing the sequence of motions to complete the task by the particular person;
   parsing the event data, including one or more operations of formatting the event data for utilization and analysis in one or more data models, comparing the event data to a data model in the one or more data models and filtering the event data for relevant data elements, to identify appropriate event data describing a discrete set of motions from the sequence of motions;
   cross indexing the appropriate event data into a common repository of a multi-mode event database for correlation across the multiple audio and video capture devices and event types to create cross indexed appropriate event data, wherein each event has a reference to an original media resource that includes a link to a video file enabling the particular person to view a video associated with a retrieved event;
   analyzing, using an analysis server, the cross indexed appropriate event data describing the discrete set of motions to form a labor standard that is specific to the particular person and specifies an optimal manner of performing the discrete set of motions for the particular person, using profile data including height, weight, age, physical limitations, experience, a work schedule, known physical limitations that prevent performance of certain tasks, list of certifications obtained and a customized labor standard associated with the particular person that accounts for strengths and weaknesses of the particular person; and
   generating a set of recommendations for performing the task efficiently according to the labor standard.

2. The computer implemented method of claim 1, wherein the set of recommendations specifies a time for performing the discrete set of motions and further comprising:
   monitoring to determine when the particular person is not in compliance with the labor standard for performing the discrete set of motions; and
   responsive to determining that the particular person is not in compliance with the labor standard, notifying the particular person that the discrete set of motions fails to comply with the labor standard.

3. The computer implemented method of claim 1, wherein the set of recommendations identifies the particular person for performing the discrete set of motions and further comprising:
   customizing the labor standard for the particular person according to the height, weight, age, physical limitations, and experience of the particular person.

4. The computer implemented method of claim 1, wherein the optimal manner is an optimal sequence for performing the discrete set of motions; and wherein the discrete set of motions include two or more of a placement of an identified material into a first identified hand, a placement and orientation of the identified material by the particular person, a placement of an identified tool into a second identified hand, an action performed by the particular person using the identified tool, and a placement and orientation of feet of the particular person; and wherein the first identified hand and the second identified hand are each identified as one of a dominant hand or a non-dominant hand.

5. The computer implemented method of claim 1, wherein the set of recommendations identifies a set of tools for performing the discrete set of motions.

6. The computer implemented method of claim 1, wherein the set of recommendations are generated by the analysis server.

7. The computer implemented method of claim 1, further comprising:
   receiving sensor data including detection data as video data from a set of sensors associated with a facility; and
   analyzing the video data that to identify the event data, wherein analyzing the video data comprises generating the metadata describing the sequence of motions for performing the task.

8. The computer implemented method of claim 7, wherein the set of sensors comprises a set of digital video cameras, a set of environmental condition sensors, and a set of physical presence and motion sensors that identify a location and motion of people and items.

9. The computer implemented method of claim 1, wherein parsing the event data further comprises:
   processing the event data using one or more of a statistical method, a data mining method, a causal model, a mathematical model, and a simulation model.

10. A computer program product comprising:
    a non-transitory computer usable medium having computer usable program code for managing a task stored thereon for execution by a computer of a smart detection system, the computer usable program code comprising:
    computer usable program code for receiving by the computer of the smart detection system continuous audio and video stream data simultaneously from multiple audio and video capture devices representative of a particular person performing a sequence of motions to complete task;
    computer usable program code for automatically detecting event data by the computer of the smart detection system, from the continuous audio and video stream data generated by the multiple audio and video capture devices, wherein the event data comprises metadata describing the sequence of motions to complete the task by the particular person;
    computer usable program code for parsing the event data including one or more operations of formatting the event data for utilization and analysis in one or more data models, comparing the event data to a data model in the one or more data models and filtering the event data for relevant data elements to identify appropriate event data describing a discrete set of motions from the sequence of motions;

computer usable program code for cross indexing the appropriate event data into a common repository of a multi-mode event database for correlation across the multiple audio and video capture devices and event types to create cross indexed appropriate event data, wherein each event has a reference to an original media resource that includes a link to a video file enabling the particular person to view a video associated with a retrieved event;

computer usable program code for analyzing, using an analysis server, the cross indexed appropriate event data describing the discrete set of motions to form a labor standard that is specific to the particular person and specifies an optimal manner of performing the discrete set of motions for the particular person, using profile data including height, weight, age, physical limitations, experience, a work schedule, known physical limitations that prevent performance of certain tasks, list of certifications obtained and a customized labor standard associated with the particular person that accounts for strengths and weaknesses of the particular person; and computer usable program code for generating a set of recommendations for performing the task efficiently according to the labor standard.

11. The computer program product of claim 10 wherein the set of recommendations specifies a time for performing the discrete set of motions and further comprising:

computer usable program code for monitoring to determine when the particular person is not in compliance with the labor standard for performing the discrete set of motions; and computer usable program code, responsive to determining that the particular person is not in compliance with the labor standard, for notifying the particular person that the discrete set of motions fails to comply with the labor standard.

12. The computer program product of claim 10, wherein the set of recommendations identifies the particular person for performing the discrete set of motions and further comprising:

computer usable program code for customizing the labor standard for the particular person according to the height, weight, age, physical limitations, and experience of the particular person.

13. The computer program product of claim 10, wherein the optimal manner is an optimal sequence for performing the discrete set of motions; and wherein the discrete set of motions include two or more of a placement of an identified material into a first identified hand, a placement and orientation of the identified material by the particular person, a placement of an identified tool into a second identified hand, an action performed by the particular person using the identified tool, and a placement and orientation of feet of the particular person; and wherein the first identified hand and the second identified hand are each identified as one of a dominant hand or a non-dominant hand.

14. The computer program product of claim 10, wherein the set of recommendations identifies a set of tools for performing the discrete set of motions.

15. The computer program product of claim 10, wherein the set of recommendations are generated by the analysis server.

16. The computer program product of claim 10, further comprising:

computer usable program code for receiving sensor data including detection data as video data from a set of sensors associated with a facility; and computer usable program code for analyzing the video data that to identify the event data, wherein analyzing the video data comprises generating the metadata describing the sequence of motions for performing the task.

17. The computer program product of claim 16, wherein the set of sensors comprises a set of digital video cameras, a set of environmental condition sensors, and a set of physical presence and motion sensors that identify a location and motion of people and items.

18. The computer program product of claim 10, wherein the computer usable program code for parsing the event data further comprises:

computer usable program code for processing the event data using one of more of a statistical method, a data mining method, a causal model, a mathematical model, and a simulation model.

19. A system for managing a task, the system comprising:

a set of sensors comprises multiple audio and video capture devices for generating continuous audio and video stream data representative of a particular person performing a sequence of motions to complete the task;

a database, wherein the database stores the continuous audio and video stream data generated by the multiple audio and video capture devices;

an analysis server, wherein the analysis server:
automatically detects event data by a computer of a smart detection system from the multiple audio and video capture devices including the generated continuous audio and video stream data, wherein the event data comprises metadata describing the sequence of motions to complete the task by the particular person;

parses the event data, including one or more operations of formatting the event data for utilization and analysis in one or more data models, comparing the event data to a data model in the one or more data models and filtering the event data for relevant data elements, to identify appropriate event data describing a discrete set of motions from the sequence of motions;

cross indexes the appropriate event data into a common repository of a multi-mode event database for correlation across the multiple audio and video capture devices and event types to create cross indexed appropriate event data, wherein each event has a reference to an original media resource that includes a link to a video file enabling the particular person to view a video associated with a retrieved event;

analyzes the cross indexed appropriate event data describing the discrete set of motions to form a labor standard that is specific to the particular person and, specifies an optimal manner of performing the discrete set of motions for the particular person, using profile data including height, weight, age, physical limitations, experience, a work schedule, known physical limitations that prevent performance of certain tasks, list of certifications obtained and a customized labor standard associated with the particular person that accounts for strengths and weaknesses of the particular person; and generates a set of recommendations for performing the task efficiently according to the labor standard.

20. The system of claim 19, wherein the set of sensors comprises a set of digital video cameras, a set of environmental condition sensors, and a set of physical presence and motion sensors that identify a location and motion of people and items.

* * * * *